US011668808B2

United States Patent
Usaj et al.

(10) Patent No.: US 11,668,808 B2
(45) Date of Patent: Jun. 6, 2023

(54) METHODS AND APPARATUS FOR MULTIMODAL AUDIENCE DETECTION AND IDENTIFICATION

(71) Applicant: The Nielsen Company (US), LLC, New York, NY (US)

(72) Inventors: Marko Usaj, Izola (SI); Andrej Barbis, Ilirska Bistrica (SI); Joze Arh, Rakek (SI); John Stavropoulos, Edison, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 649 days.

(21) Appl. No.: 16/554,376

(22) Filed: Aug. 28, 2019

(65) Prior Publication Data

US 2021/0063556 A1 Mar. 4, 2021

(51) Int. Cl.
| | | |
|---|---|---|
| *G01S 13/04* | (2006.01) | |
| *G01S 7/41* | (2006.01) | |
| *H04B 17/318* | (2015.01) | |
| *G01S 11/06* | (2006.01) | |
| *H04N 21/41* | (2011.01) | |

(Continued)

(52) U.S. Cl.
CPC ............. *G01S 13/04* (2013.01); *G01S 7/412* (2013.01); *G01S 11/06* (2013.01); *H04B 17/318* (2015.01); *H04N 21/4126* (2013.01); *H04W 4/80* (2018.02); *H04W 64/003* (2013.01)

(58) Field of Classification Search
CPC . G01S 11/06; G01S 13/04; G01S 5/14; G01S 7/412; H04B 17/318; H04N 21/4126; H04N 21/44218; H04W 4/80; H04W 64/003
See application file for complete search history.

(56) References Cited

U.S. PATENT DOCUMENTS

| | | |
|---|---|---|
| 6,909,921 B1 | 6/2005 | Bilger |
| 7,756,002 B2 | 7/2010 | Batra et al. |
| 8,847,754 B2 | 9/2014 | Buchheim et al. |

(Continued)

OTHER PUBLICATIONS

Wang et al., "Bluetooth Positioning using RSSI and Triangulation Methods," 2013 IEEE 10th Consumer Communications and Networking Conference (CCNC), Las Vegas, NV, Jan. 2013, abstract only [https://ieeexplore.ieee.org/abstract/document/6488558, retrieved Jan. 28, 2019] (3 pages).

Cabarkapa et al., "Comparative Analysis of the Bluetooth Low-Energy Indoor Positioning Systems," 12th International Conference on Telecommunications in Modem Satellite, Cable and Broadcasting Services (TELSIKS), Nis, Serbia, Oct. 2015 (5 pages).

(Continued)

*Primary Examiner* — Timothy X Pham
(74) *Attorney, Agent, or Firm* — Hanley, Flight & Zimmerman, LLC

(57) ABSTRACT

Methods, apparatus, systems and articles of manufacture are disclosed for multimodal audience detection and identification. An example apparatus disclosed herein includes a signal strength value selector to select a portion of a set of signal strength values associated with advertising packets from a device associated with a user, the advertising packets captured by a multi-axis receiver on a plurality of different signal polarizations, a signal strength calculator to calculate a first representative signal strength value based on the selected portion of signal strength values, and a presence determiner to determine a presence of the user based on whether the first representative signal strength value satisfies a threshold.

21 Claims, 9 Drawing Sheets

(51) Int. Cl.
*H04W 4/80* (2018.01)
*H04W 64/00* (2009.01)

(56) References Cited

U.S. PATENT DOCUMENTS

| | | |
|---|---|---|
| 9,277,276 B1 | 3/2016 | Arini et al. |
| 2008/0270172 A1 | 10/2008 | Luff et al. |
| 2013/0104238 A1 | 4/2013 | Balsan et al. |
| 2014/0074566 A1 | 3/2014 | McCoy et al. |
| 2014/0295764 A1 | 10/2014 | Jain et al. |
| 2015/0254737 A1 | 9/2015 | Shin et al. |
| 2015/0370323 A1 | 12/2015 | Cieplinski et al. |
| 2016/0021910 A1 | 1/2016 | Muller-Vivil |
| 2016/0049071 A1 | 2/2016 | Beaver et al. |
| 2016/0055690 A1 | 2/2016 | Raina et al. |
| 2016/0284185 A1 | 9/2016 | Maison et al. |
| 2016/0295364 A1 | 10/2016 | Zakaria |
| 2018/0068315 A1 | 3/2018 | Bergdale et al. |
| 2020/0074506 A1* | 3/2020 | Garcia Galvao Almeida .............. G06Q 30/0261 |
| 2020/0269809 A1* | 8/2020 | Sanji ........................ B60R 25/31 |
| 2020/0314590 A1* | 10/2020 | Odejerte, Jr. ......... H04W 4/046 |
| 2020/0367192 A1* | 11/2020 | Ji ........................ H04W 64/003 |
| 2021/0021962 A1* | 1/2021 | Diaz Fuente ....... H04W 64/006 |

OTHER PUBLICATIONS

Jianyong et al., "RSSI Based Bluetooth Low Energy Indoor Positioning," 2014 International Conference on Indoor Positioning and Indoor Navigation (IPIN), Oct. 2014, Busan, South Korea, Oct. 2014, abstract only [https://ieeexplore.ieee.org/abstract/document/7275525, retrieved Jan. 28, 2019] (3 pages).

Faragher et al., "An Analysis of the Accuracy of Bluetooth Low Energy for Indoor Positioning Applications," Proceedings of the 27th International Technical Meeting of the Satellite Division of the Institute of Navigation (ION GNSS+ 2014), pp. 201-210, Sep. 2014 (10 pages).

Texas Instruments, "IWR6843 Single-Chip 60- to 64-GHz mmWave Sensor," Advance Information, available Oct. 2018 (70 pages).

Texas Instruments, "People Counting Demonstration using TI mmWave Sensors," YouTube, Jan. 8, 2018 (2 pages). Retrieved from the Internet on Feb. 20, 2020 [https://www.youtube.com/watch?v=RT56YzqME6M].

International Searching Authority, "International Search Report", issued in connection with International Patent Application No. PCT/US2020/048009 dated Nov. 27, 2020, 3 pages.

International Searching Authority, "Written Opinion", issued in connection with International Patent Application No. PCT/US2020/048009 dated Nov. 27, 2020, 5 pages.

\* cited by examiner

METHODS AND APPARATUS FOR MULTIMODAL AUDIENCE DETECTION AND IDENTIFICATION

FIELD OF THE DISCLOSURE

This disclosure relates generally to audience monitoring, and, more particularly, to methods and apparatus for multimodal audience detection and identification.

BACKGROUND

Media providers and/or other entities such as advertising companies, broadcast networks, etc., are often interested in the viewing, listening, and/or media behavior of audience members and/or the public in general. The media usage and/or exposure habits of monitored audience members, as well as demographic data about the audience members, are collected and used to statistically determine the size and/or demographics of an audience of interest. To determine the media usage and/or exposure habits of monitored audience members, interested entities may need to determine what persons were present at a media device during a media presentation on that media device.

Figure 1:
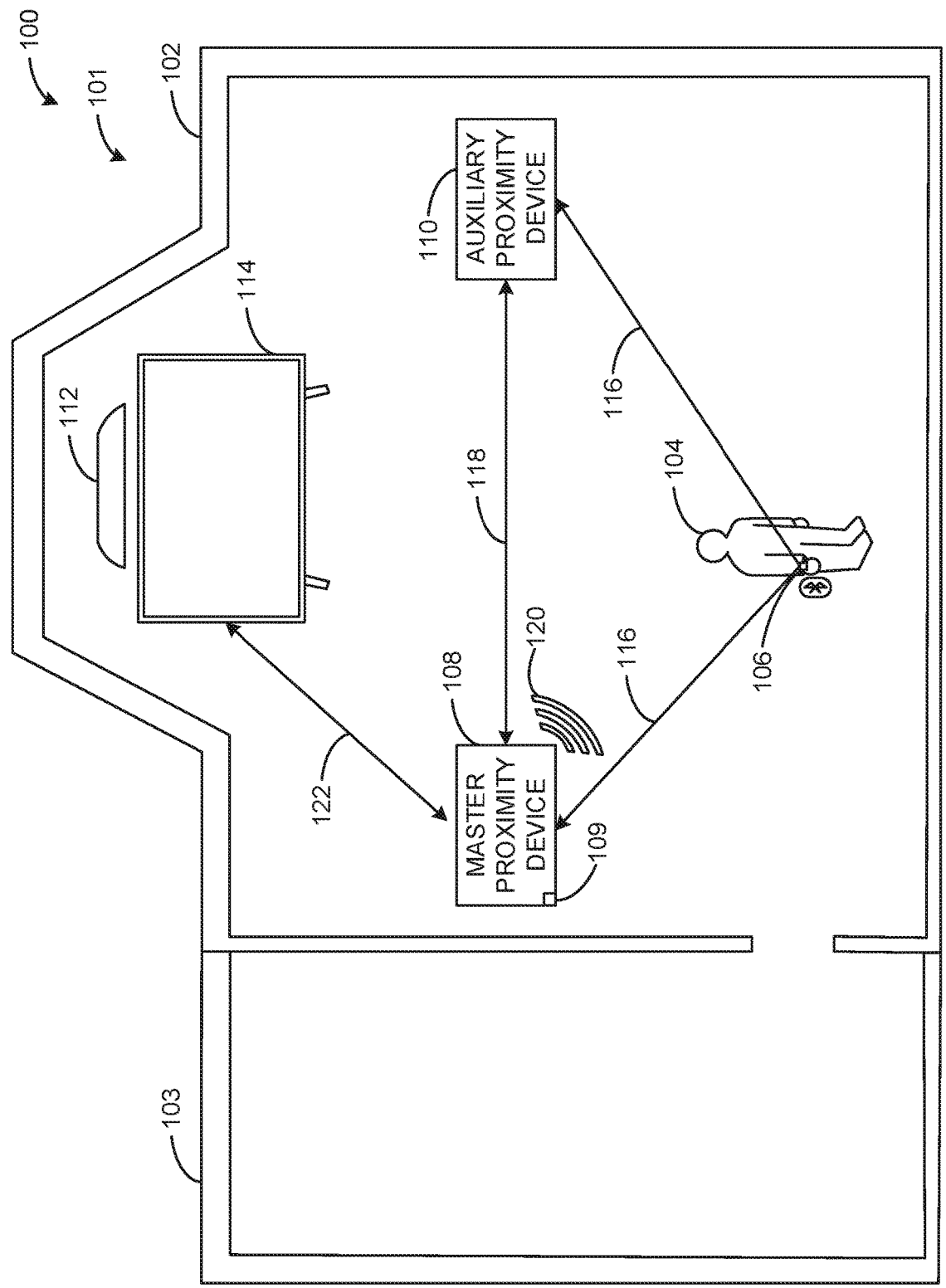
FIG. 1 illustrates an example environment of use including an example system for multimodal audience detection and identification.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference)

media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Bluetooth (BLE) enabled devices transmit advertising packets to allow other devices to detect and connect with the Bluetooth enabled devices. Devices receiving the advertising packets can use the received packets to identify the transmitting device and connect to the transmitting device. The signal strength of the advertising packet (and any other radio signal) at the received device can be measured via a received signal strength indicator (RSSI). The RSSI of an advertising packet may be difficult to predict in indoor spaces given signal spreading. For example, signal spreading can depend on the configuration of the indoor space (e.g., room geometry, furniture, etc.), materials and/or moving obstructions (e.g., people, animals, etc.). In some examples, room configurations can cause standing waves (e.g., stationary waves, etc.) to form, further making RSSI values inconsistent. Accordingly, using the signal strength of Bluetooth advertising packets to monitor audience presence can be difficult. While examples disclosed herein are described with reference to RSSI values, any other suitable type and/or measure of signal strength value can be used instead.

Methods, apparatus and systems disclosed herein monitor audience presence using BLE low energy packet scanning. In some examples disclosed herein, audience presence monitoring using BLE advertisement packet scanning is combined with audience presence monitoring using Ultra-wide Band (UWB) radar. In some examples disclosed herein, audience members are tracked by scanning for BLE advertisement packets on different signal polarities on different channels and by using a multi-axis antenna array. In some examples disclosed herein, the detected signal strengths are sorted and analyzed to determine a representative signal strength value. In some examples disclosed herein, multiple devices are positioned in a media presentation area to capture BLE advertising. In some such examples disclosed herein, a dynamic threshold and a voting mechanism is used to analyze the determination from the multiple devices. In some examples disclosed herein, combining UWB radar and packet monitoring allows monitoring information to be correlated with radar detection. Examples disclosed herein improve the reliability of results by reducing false-positive readings and by tracking audience members not wearing BLE compatible personal devices.

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

FIG. 1 is an illustrates an example environment 100 including an example system 101 for multimodal audience detection and identification. The example environment 100 includes an example media presentation area 102, an example non-presentation area 103 and an example user 104 possessing an example mobile device 106. The example system 101 includes an example master proximity device 108 with an example signal strength monitor 109, an example auxiliary proximity device 110, and an example media monitor 112 associated with an example media presentation device 114.

The example media presentation area 102 is a physical space where media is presented by the media presentation device 114. The example non-presentation area 103 is a physical space associated with the media presentation area 102 but where the media presented by the media presentation device 114 is not viewable/audible. In the illustrated example of FIG. 1, the areas 102, 103 are rooms in the home of the example user 104. In other examples, the environment 100, the example media presentation area 102, the example non-presentation area 103 can be any area in which media is presented (e.g., public transit, a business, etc.). In some examples, the media presentation area 102 may contain physical objects that may interfere with the transmission of signals (e.g., furniture, etc.). In some examples, the media presentation area 102 can be configured in a manner that determining the origin of a signal emitted therein difficult. For example, the media presentation area 102 can be configured in a manner that allows standing waves to form.

The example user 104 is a person viewing media presented on the example media presentation device 114. In the illustrated example of FIG. 1, the example user 104 is carrying the example mobile device 106. In some examples, the user 104 is a panelist associated with audience monitoring entity (AME). A panelist is a user registered on panels maintained by an AME that owns and/or operates a ratings entity subsystem. In such examples, the AME monitors the user 104 after the user 104 consents to being enrolled into a panel. During enrollment, the audience measurement entity receives demographic information from the user 104 so that subsequent correlations may be made between advertisement/media exposure to the user 104 and different demographic markets. In some examples, the AME can enroll additional users into the user (e.g., additional users associated with the media presentation area 102, etc.).

The example mobile device 106 is a BLE enabled device that admits BLE communications. In some examples, the BLE enabled mobile device 106 emits advertising packets. As used herein, "an advertising packet" is a periodically transmitted data packet advertising the existence of the mobile device 106. In some examples, mobile device 106 emits advertising packets over multiple channels (e.g., 3 channels, etc.). In some examples, the advertising packets emitted by the BLE enabled mobile device 106 contain information (e.g., a user and/or device identifier, a BLE beacon ID, a BLE media access control (MAC) address, etc.) allowing the identification of the mobile device 106 and/or the user 104. In the illustrated example of FIG. 1, the mobile device 106 is a smart watch. In other examples, the mobile device 106 can be any suitable BLE enabled device (e.g., a wearable device, smartphone, a tablet, a laptop, etc.). In some examples, an AME can correlate (e.g., during the enroll of the user 104 into a panel, etc.) the mobile device 106 with the user 104. In some examples, the presence of advertising packets of the mobile device 106 can be correlated with the presence of the user 104. In such examples, the AME and/or the media monitor 112 can associate the demographics of the user 104 with the mobile device 106. In this matter, an AME can credit a demographic group associated with the user 104 with an impression of media when that media is being presented in the media presentation area 102 and advertising packets from the mobile device 106 are detected in the media presentation area 102.

The example master proximity device 108 is a physical device configured to capture emitted advertising packets and determine if the user 104 is present in the media presentation area 102. For example, the master proximity device 108 includes the example signal strength monitor 109, which can determine a set of signal strength values (e.g., RSSI values) associated with the emitted advertising packets. In some examples, the signal strength monitor 109 can sort the determined signal strength values, select a portion of the sorted signal strength values, and determine a representative signal strength value. Ins some examples, the example signal strength monitor 109 can determine if the user 104 is present in the media presentation area 102 based on the representative signal strength value. In some examples, the example signal strength monitor 109 can transmit the presence determination to the media monitor 112. In such examples, the signal strength monitor 109 can calculate and report a list of identifiers (e.g., a user identifier, a device identifier, a BLE beacon ID, a BLE MAC address, etc.) associated with the users 104 and/or devices 106 present in the media presentation area 102 in a particular media area. The example master proximity device 108 is described in greater detail below in conjunction with FIGS. 2A-5.

The example auxiliary proximity device 110 is a physical device that is configured to capture emitted advertising packets. For example, the auxiliary proximity device 110 can determine respective signal strength values (e.g., RSSI values) associated with the corresponding emitted advertising packets. In some examples, the auxiliary proximity device 110 can sort the determined signal strength values, select a portion of the sorted signal strength values, and determine a representative signal strength value (e.g., a second representative signal strength value, etc.). In the illustrated example of FIG. 1, the example auxiliary proximate device 110 transmits the determined representative signal strength value to the master proximity device 108. In some such examples, the master proximity device 108 and/or signal strength monitor 109 uses the determined representative signal strength value to determine if the user 104 was present in the media presentation area 102. While the only one auxiliary proximity device 110 is illustrated in FIG. 1, the media presentation area 102 can include any number of auxiliary proximity device(s) 110. In some examples, increasing the number of auxiliary proximity device(s) 110 can increase the accuracy of the method, apparatus and/or systems disclosed herein.

The example media monitor 112 is a media monitoring device that is installed in the environment 100 to collect records of media consumed in the example environment 100 (e.g., media consumed by the user 104). For example, the media monitor 112 can generate and/or identify media identifiers (e.g., watermarks, media signatures, etc.) associated with media presented in the environment 100. In some examples, the media monitor 112 can generate a report indicating when users (e.g., the user 104, etc.) are present in the media presentation area 102 and what media is being presented in the media presentation area 102 at a given time. In the illustrated example, the media monitor 112 is in communication with the master proximity device 108. Additionally or alternatively, the media monitor 112 can communicate with the auxiliary proximity device 110. In some examples, the media monitor 112 can include some or all of the functionality of the master proximity device 108 and/or the auxiliary proximity device 110. In some examples, the master proximity device 108, the auxiliary proximity device 110, and/or the media monitor 112 is/are installed in the environment 100 by a technician when the user is enrolled as a panelist by an AME associated with the media monitor 112.

The example media presentation device 114 is a device that presents media in the example media presentation area 102. In some examples, the example media presentation device 114 is capable of directly presenting media (e.g., via a display). In other examples, the media presentation device 114 can present the media on separate media presentation equipment (e.g., speakers, a display, etc.). Thus, as used herein "media devices" may or may not be able to present media without assistance from a second device. Media devices are typically consumer electronics devices. For example, the media presentation device 114 can be a television and, thus, is capable of directly presenting media (e.g., via an integrated and/or connected display and speakers). Any other type(s) and/or number(s) of media device(s) can additionally or alternatively be monitored by the media monitor 112. For example, Internet-enabled mobile handsets (e.g., a smartphone, an iPod®, etc.), video game consoles (e.g., Xbox One®, PlayStation 4, etc.), tablet computers (e.g., an iPad®, a Motorola™ Xoom™ etc.), digital media players (e.g., a Roku® media player, a Slingbox®, a Tivo®, etc.), smart televisions, desktop computers, laptop computers, servers, etc., may additionally or alternatively be monitored by the media monitor 112.

In operation, the master proximity device 108 and/or the auxiliary proximity device(s) 110 detect example advertising packets 116 emitted by the mobile device 106. In the illustrated example of FIG. 1, the master proximity device 108 includes and/or interfaces with an example UWB radar transceiver 120 to detect the physical presence of the user 104. In some such examples, the UWB radar transceiver 120 allows the master proximity device 108 to detect the presence of the user 104 in the presentation area but does not enable the master proximity device 108 to identify the user 104. In the illustrated example of FIG. 1, the auxiliary proximity device 110 similarly captures the emitted advertising packets 116 and transmits example auxiliary signal strength values 118 to the master proximity device 108. The master proximity device 108 can analyze the UWB radar transceiver 120 results, the auxiliary signal strength values 118 and the advertising packets 116 to determine if the user 104 is present in the media presentation area 102. In some examples, the master proximity device 108 can capture advertising packets 116 emitted by the mobile device 106 when the user 104 is not in the media presentation area 102 (e.g., the user 104 is in the non-presentation area 103, etc.). The master proximity device 108 then transmits example presence determinations 122 to the media monitor 112. In some examples, the example presence determinations 122 include a report indicating if the user 104 was present in the media presentation area 102.

Figure 2A:
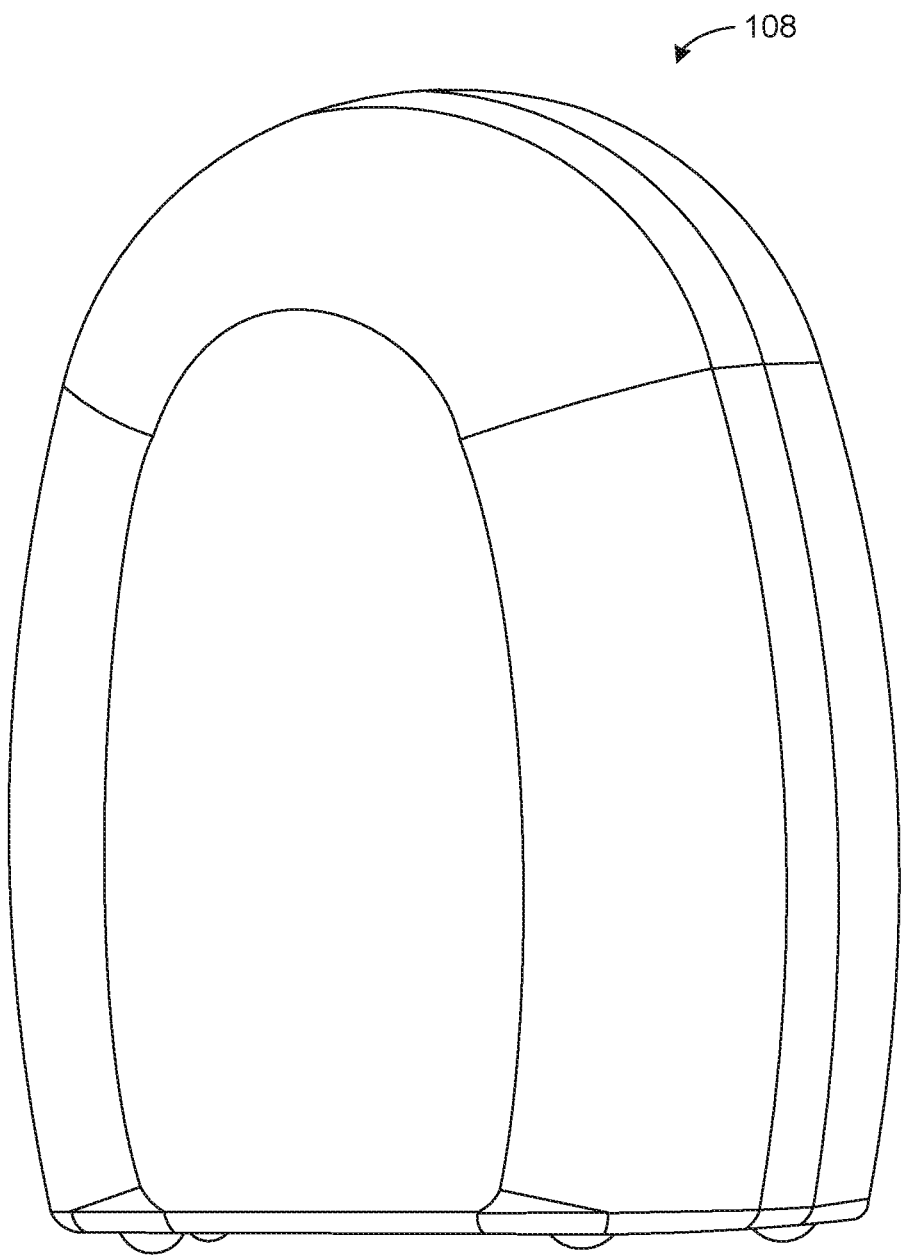
FIGS. 2A-2B illustrates an example master proximity device included in the example system of FIG. 1.

FIG. 2A is a front view of the example master proximity device 108 of FIG. 1 In the illustrated example of FIG. 2A, the example master proximity device 108 is a free-standing device to be placed in the media presentation area 102. In some examples, the master proximity device 108 can be incorporated into the media monitor 112 and/or the media presentation device 114. In some examples, the location of the master proximity device 108 is placed in the media presentation area 102 when the user 104 is enrolled in the panel. In some examples, the user 104 places the device in the media presentation area 102. In other examples, a technician associated with the AME, manufacturer of the master proximity device 108, and/or the media monitor 112 can install the device. In some examples, the technician can map the media presentation area 102 to ensure the master proximity device 108 is placed in an optimal part of the media presentation area 102. In some examples, one or more auxiliary device(s) 110 can be similarly placed in the media presentation area 102 by the user and/or technician. In some examples, the auxiliary proximity device 110 can be a same type of device or modified version of the master proximity device 108 illustrated in FIG. 2A. In other examples, the auxiliary proximity device 110 can be any other suitable device.

Figure 2B:
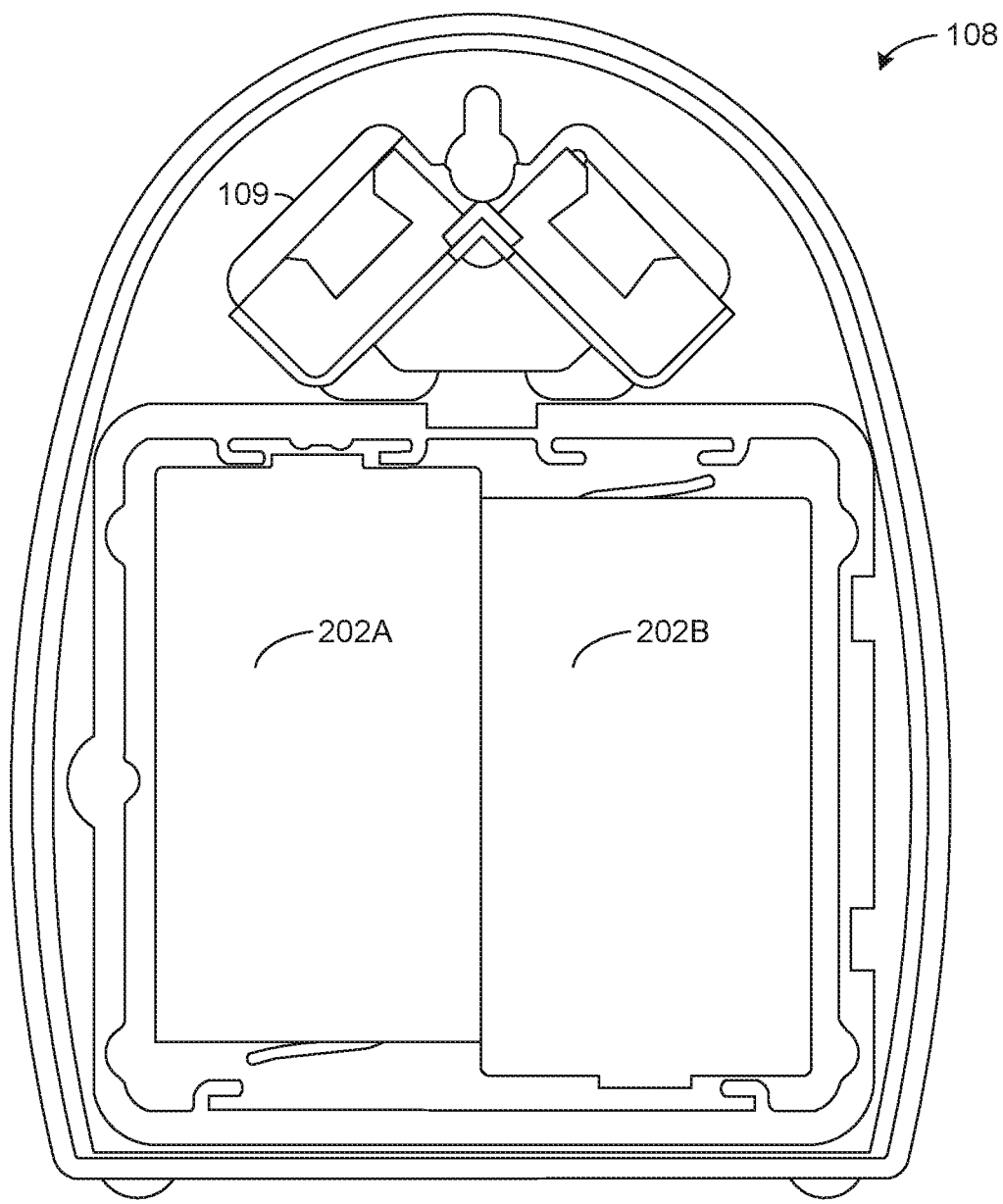

FIG. 2B is a rear view of the example master proximity device 108 of FIG. 1. In the illustrated example of FIG. 2B, the master proximity device includes an example first battery pack 202A, an example second battery pack 202B and the example signal strength monitor 109 of FIG. 1.

The example battery packs 202A, 202B are battery packs coupled within the master proximity device 108 to power the master proximity device 108, the signal strength monitor 109. In some examples, the battery packs 202A, 202B are long-term rechargeable batteries (e.g., nickel-cadmium batteries, lithium-ion batteries, alkaline, etc.). In the illustrated example, two battery packs 202A, 202B are used to power the example master proximity device 108. In other examples, any number of battery packs can be utilized. In other examples, the battery packs 202A, 202B can be absent. In such examples, the example master proximity device 108 can be powered by a USB connection, an alternating current (AC) wall connection, etc. In such examples, the master proximity device 108 and/or the auxiliary proximity device(s) 110 can be positioned in the media presentation area 102 to facilitate the powering of the master proximity device 108 and/or the auxiliary proximity device(s) 110.

In the illustrated example of FIG. 2B, the signal strength monitor 109 includes a set of BLE receivers oriented along a corresponding set of axes (e.g., a set of receivers configured to capture packets along a corresponding set of polarities, etc.) In other examples, signal strength monitor 109 can include any other and/or additional suitable means for capturing advertising packets (e.g., a receiver, a transceiver, a reflector, etc.). In some examples, signal strength monitor 109 can include any additional hardware, software and/or firmware necessary to process and/or analyze the capture advertising packets. In some examples, the master proximity device 108 can include the advertising packet detector(s). In some examples, the master proximity device 108 includes multiple advertising packet detector(s) spaced apart at half of the wavelength of the advertising packets. In other examples, the master proximity device 108 can include multiple advertising packet detector(s) spaced apart at any suitable distance. An example implementation of the signal strength monitor 109 of FIGS. 1 and 2B is described below in conjunction with FIG. 3.

Figure 3:
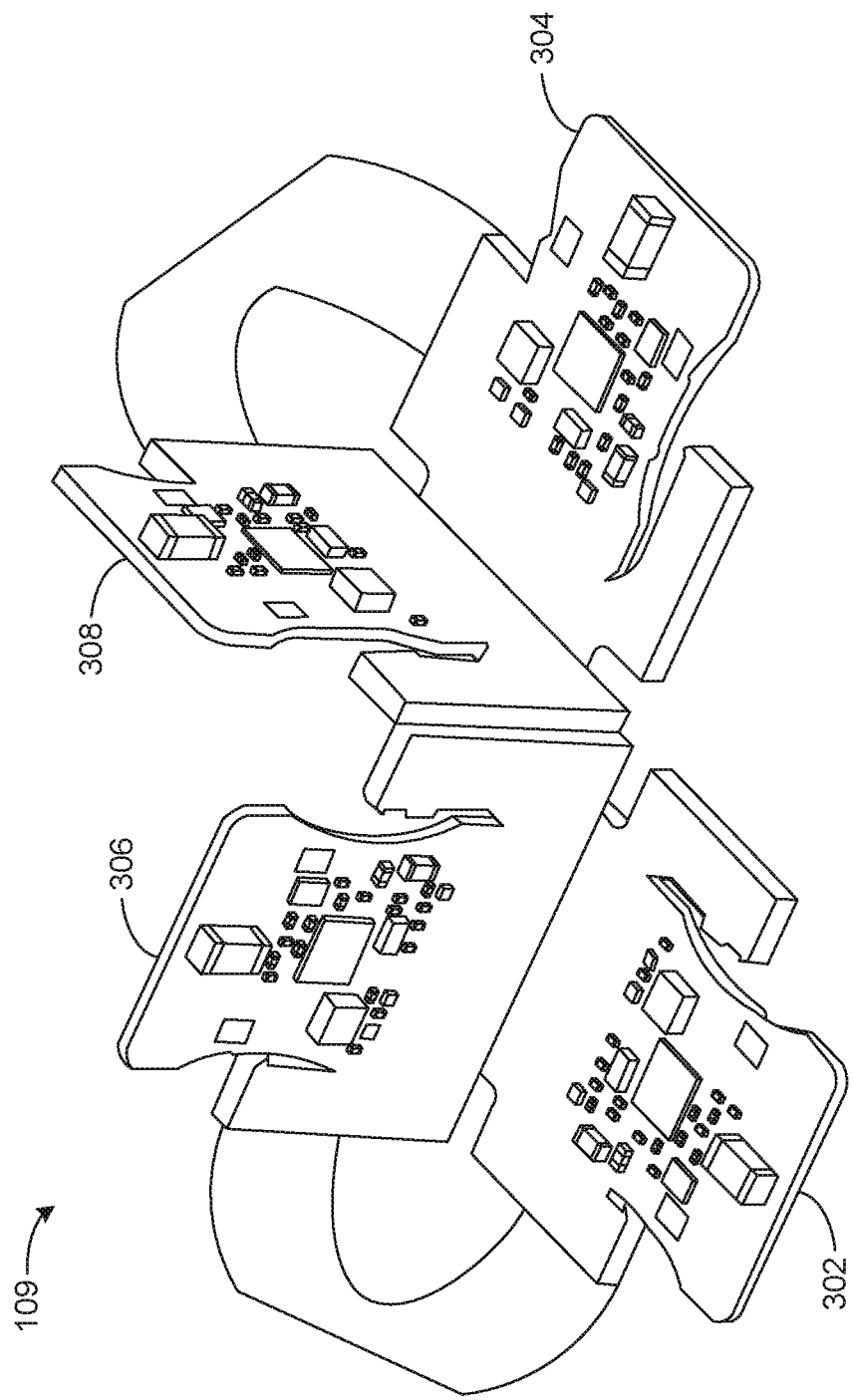
FIG. 3 illustrates an example advertising packet detector included in the example master proximity device of FIG. 2B.

FIG. 3 is an illustration of the example signal strength monitor 109 of FIGS. 1 and 2B. In the illustrated example of FIG. 3, the signal strength monitor 109 includes an example first receiver 302, an example second receiver 304, an example third receiver 306 and the example processing and communication module 308.

The example receivers 302, 304, 306 include radio receivers configured to capture BLE advertising packets transmitted over a variety of transmission channels. In the illustrated example of FIG. 3, the first receiver 302 is configured (e.g., aligned, etc.) to capture advertising packets along the x-axis polarity. In the illustrated example of FIG. 3, the second receiver 304 is configured (e.g., aligned, etc.) to capture advertising packets along the y-axis polarity. In the illustrated example of FIG. 3, the third receiver 306 is configured (e.g., aligned, etc.) to capture advertising packets along the z-axis polarity. In some examples, some or all of the receivers 302, 304, 306 can be dipole receivers.

The example processing and communication module 308 controls the receivers 302, 304, 306. In some examples, the receivers 302, 304, 306 can be deactivated (e.g., in sleep mode, etc.) during inactivity to conserve power. In such examples, the processing and communication module 308 can detect transmitted advertising packets and activate the receivers 302, 304, 306. In some examples, the example processing and communication module 308 can facilitate communication between the master proximity device 108, the example auxiliary device(s) 110, and/or the media monitor 112. An example implementation of the processing and communication module 308 is described below in conjunction with FIG. 5.

Figure 4:
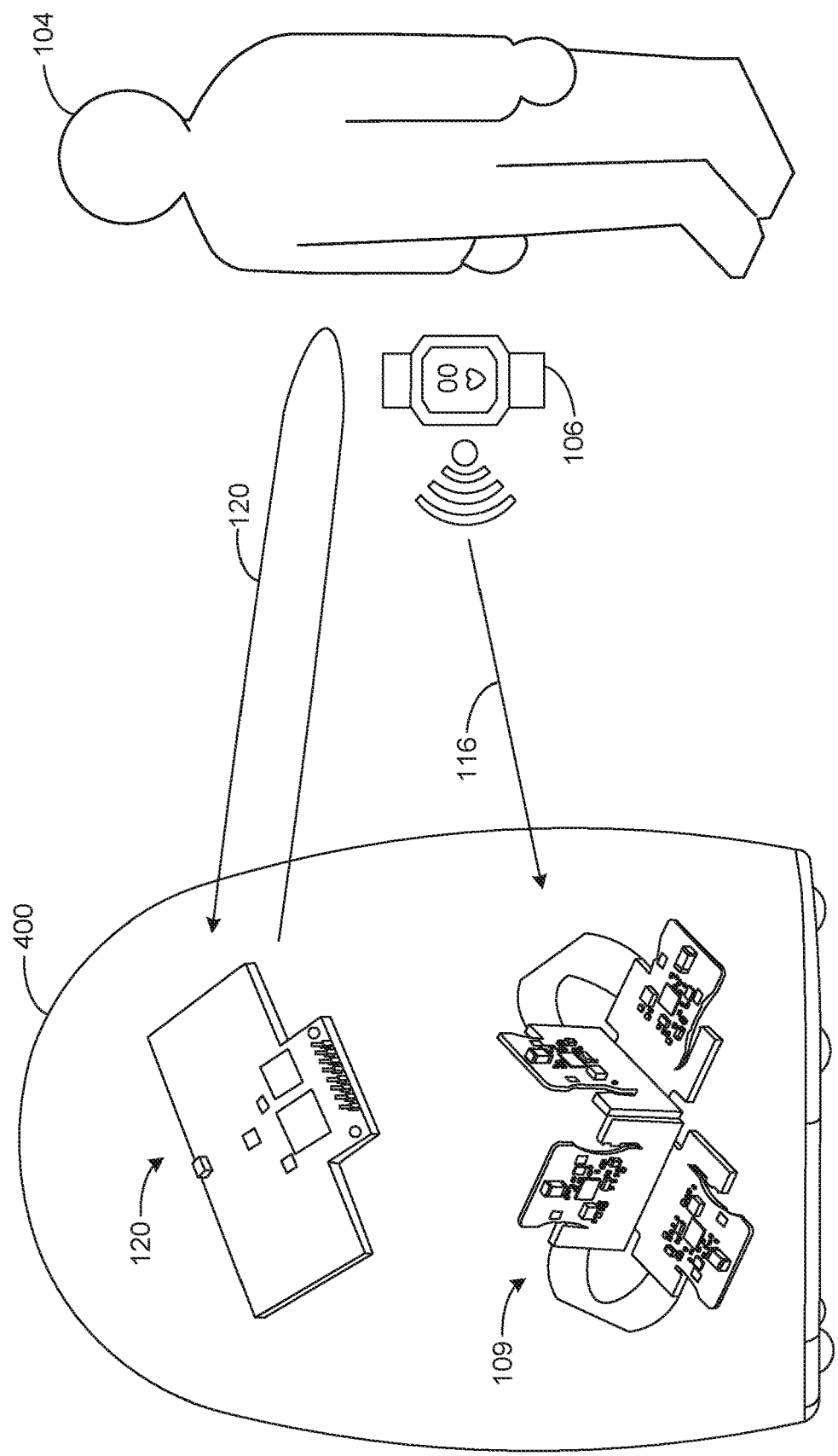
FIG. 4 illustrates example operation of the proximity monitor of FIGS. 1-3 in combination with a second example proximity monitor.

FIG. 4 illustrates an example monitor 400 including the example signal strength monitor 109 of FIGS. 1, 2B and 3 and the UWB radar transceiver 120. In the illustrated example of FIG. 4, the UWB radar transceiver 120 is an ultra-wide band (UWB) pulse radar system and includes any suitable hardware, software and/or firmware necessary to implement a UWB radar system. In other examples, the UWB radar transceiver 120 can be absent. In such examples, the example monitor 400 can include any other suitable detection system (e.g., a short-range radar system, a video analysis system, etc.).

In the illustrated example of FIG. 4, the UWB radar transceiver 120 provides highly precise position and distance determination for the user 104 and the example signal strength monitor 109 provides user identification and position estimation via BLE advertising packets (e.g., the advertising packets include user and/or device identification information, etc.). In some examples, users identified via the example signal strength monitor 109 can be correlated with proximity readings from the UWB radar transceiver 120 based on the distance determined by the UWB radar transceiver 120 and the distance estimated via the signal strength monitor 109. In this matter, the illustrated example of FIG. 4 can combine the user identification of BLE advertising packet monitoring with precise distance determination of UWB radar transceiver 120 to determine if the user 104 is present in the media presentation area 102 and track the user 104.

Figure 5:
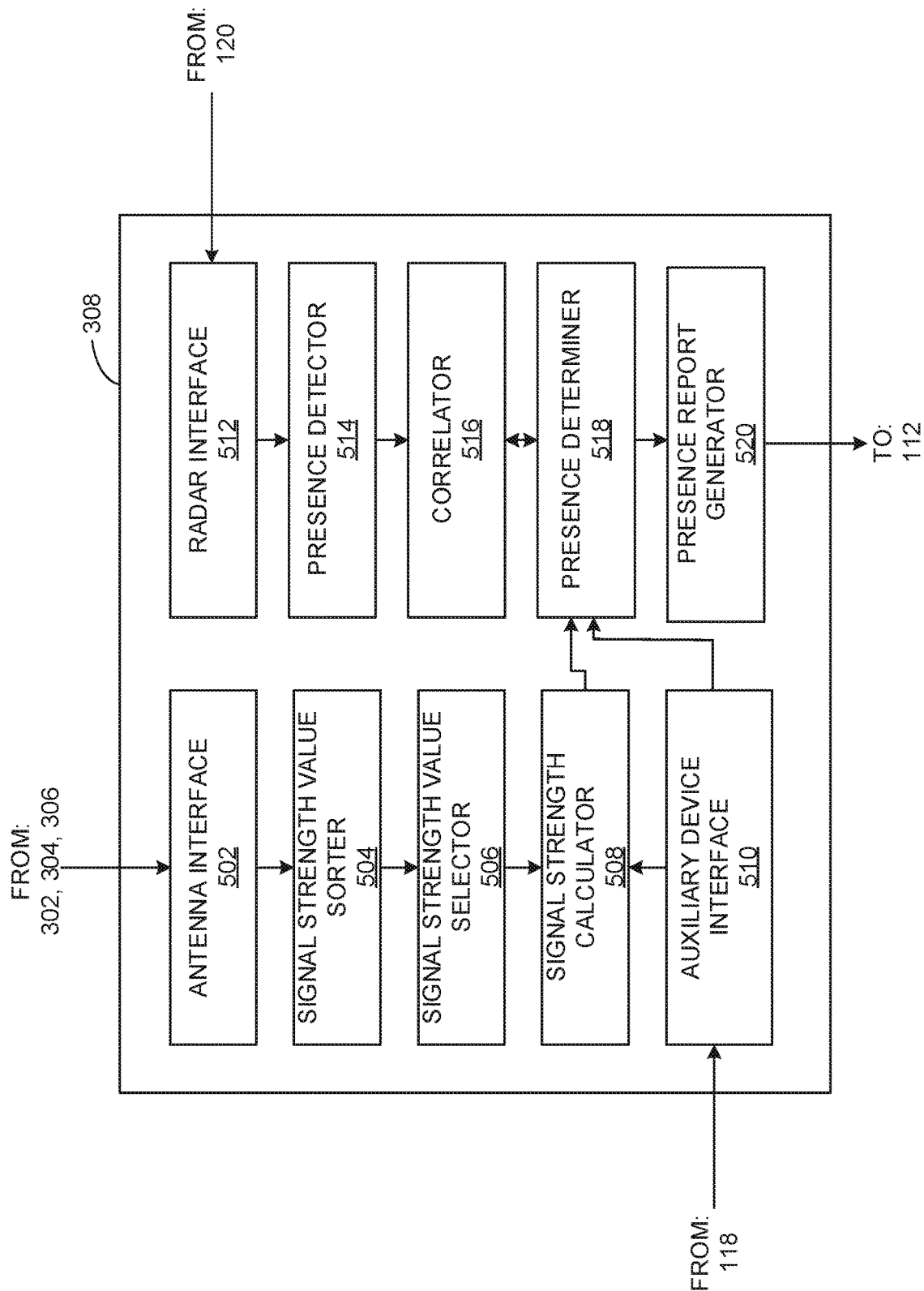
FIG. 5 is an is a block diagram representing an example implementation of the example proximity monitor of FIGS. 1-3

FIG. 5 is an is a block diagram representing an example implementation of the example processing and communication module 308 of FIG. 3. The example processing and communication module 308 includes an example receiver interface 502, an example signal strength value sorter 504, an example signal strength value selector 506, an example signal strength calculator 508, an example auxiliary device interface 510, an example radar interface 512, an example presence detector 514, an example correlator 516, an example presence determiner 518, and an example presence report generator 520. In other examples, some of all of the example functionality of the processing and communication module 308 can be via other components of the example master proximity device 108, the example auxiliary proximity device 110, the example media monitor 112, the UWB radar transceiver 120, and/or a combination thereof.

The example receiver interface 502 interfaces with the example receivers 302, 304, 306 of the signal strength monitor 109 of FIGS. 2B and 3. In some examples, the receiver interface 502 can receive information (e.g., RSSI readings, channel information, etc.) associated with advertising packets captured by any or all of the receivers 302, 304, 306. In some examples, the receiver interface 502 can associate a polarity with each of the receivers 302, 304, 306. For example, the receiver interface 502 can associate the first receiver 302 with an "x" polarity (e.g., a first polarity), the second receiver 304 with a "y" polarity (e.g., a second polarity), and the third receiver 306 with a "z" antenna (e.g., a third polarity). In some examples, the receiver interface 502 can also receive information from other receivers (e.g., receivers associated with the auxiliary device 110, additional receivers associated with the master proximity device 108, etc.). In some examples, the receiver interface 502 can receive data formatted in an analog format (e.g., voltage variations, etc.). In such examples, the receiver interface 502 can convert the captured information into a digital and/or human-readable format.

The example signal strength value sorter 504 sorts received signal strength values. For example, the signal strength value sorter 504 can sort the signal strength value of value at each antenna on each channel. For example, if the signal strength value sorter 504 is determining the RSSI associated with advertising packets received by the receivers 302, 304, 306 on three BLE channels, the signal strength value sorter 504 will sort nine RSSI values, namely (1) a first RSSI value associated with the first receiver 302 and the first channel, (2) a second RSSI value associated with the first receiver 302 and the second channel, (3) a third RSSI value associated with the first receiver 302 and the third channel, (4) a fourth RSSI value associated with the second receiver 304 and the first channel, (5) a fifth RSSI value associated with the second receiver 304 and the second channel, (6) a sixth RSSI value associated with the second receiver 304 and the third channel, (7) a seventh RSSI value associated with the third receiver 306 and the first channel, (8) a eighth RSSI value associated with the third receiver 306 and the second channel, (9) a ninth RSSI value associated with the third receiver 306 and the third channel. In some such examples, the signal strength value sorter 504 sorts the nine signal strength values based on the magnitude of the signal strength values. In some examples, the signal strength value sorter 504 can sort RSSI values from the auxiliary devices(s) 110.

The example signal strength value selector 506 selects a portion of the sorted signal strength value. For example, the signal strength value selector 506 can select an upper portion (e.g., a half, a fourth, etc.) of the sorted signal values. In other examples, the signal strength value selector 506 can select any other suitable portion of the sorted signal strength. In some examples, the signal strength value selector 506 can select a portion of sorted signal values based on an associated channel and/or polarity. In some examples, the signal strength value selector 506 can select a portion of the sorted signal strength values by removing outliers (e.g., removing the highest signal strength values, removing the lowest signal strength values, removing signal strength values exceeding a standard deviation, etc.).

The example signal strength calculator 508 calculates a representative signal strength value (e.g., a representative RSSI value, etc.) based on the selected portion of the signal strength values. For example, the example signal strength calculator 508 can calculate the representative signal strength value by calculating the arithmetic mean of the selected portion of the signal strength values. In some examples, the signal strength calculator 508 can weigh some of or all of the selected portion of the signal strength values. For example, the signal strength calculator 508 can weight a signal strength value based on the signal strength value's associated channel and/or polarity. In other examples, the signal strength calculator 508 can determine the representative signal strength value by any other suitable means (e.g., calculating a geometric mean, calculating a harmonic mean, determining a median value, etc.).

The example auxiliary device interface 510 facilitates communication between the master proximity device 108 and/or the signal strength monitor 109 and the auxiliary device(s) 110. For example, the auxiliary device interface 510 can be implemented by a LAN connection (e.g., Wi-Fi, a physical connection, etc.). In some examples, the auxiliary device interface 510 can be implemented via BLE communication interface. In some examples, the auxiliary device interface 510 allows the master proximity device 108 and/or the signal strength monitor 109 to receive RSSI information (e.g., a second representative signal strength value, additional unsorted signal strength values, etc.). In some examples, the auxiliary device interface 510 can receive or transmit any other suitable information. In some examples, the auxiliary device interface 510 can be absent. In such examples, no auxiliary device(s) 110 are present in the media presentation area 102 or the master proximity device 108 and/or the signal strength monitor 109 communicates with the auxiliary device(s) 110 via any other suitable means (e.g., communicating via the media monitor 112, etc.).

The example radar interface 512 facilitates communication between the master proximity device 108 and the UWB radar transceiver 120. For example, the example radar interface 512 can be implemented by a LAN connection (e.g., Wi-Fi, a physical connection, etc.). In some examples, the example radar interface 512 can be implemented via BLE communication interface. In some examples, the example radar interface 512 can receive presence determinations from the UWB radar transceiver 120. In some examples, the example radar interface 512 can receive or transmit any other suitable information. In some examples, the example radar interface 512 can be absent. In such examples, the master proximity device 108 communicates with the UWB radar transceiver 120 via any other suitable means (e.g., communicating via the media monitor 112, etc.).

The example presence detector 514 can analyze the information from the UWB radar transceiver 120 to determine if the user 104 is present in the media presentation area 102. For example, the presence detector 514 can analyze UWB radar readings to determine if the user 104 is present in the media presentation area. In some examples, the presence detector 514 can make a presence determination (e.g., a determination if the user 104 is in the media presentation area 102, a second presence determination, etc.). In some examples, the presence detector 514 can determine the presence of multiple users in the media presentation area. In some examples, the presence detector 514 can determine the distance the user 104 is from the master proximity device 108.

The example correlator 516 correlates the presence determination made by the presence detector 514 and the user(s) identified by the presence determiner 518. For example, the correlator 516 can compare the estimated distance of an identified user 104 identified by the presence determiner 518 and the distance determined by the presence detector 514 to determine if the presence detector 514 and the presence determiner 518 are detected the same person. In some such examples, the correlator 516 can correlate the presence determinations made the presence detector 514 and the presence determiner 518 by comparing the determined distances to a threshold. In some examples, after the presence determinations made the presence detector 514 and the presence determiner 518 have been correlated by the correlator 516, the correlator 516 can track the user 104 using the user/device identifier received via presence determiner 518 and distance/location determination determined by the presence detector 514.

The example presence determiner 518 determines a presence determination (e.g., a first presence determination, etc.) based on the representative signal strength value determined by the signal strength calculator 508. For example, the presence determiner 518 can estimate the distance to the transmitting source of the advertising packet using the signal strength value. For example, the signal strength calculator 508 can use Equation (1) and the representative signal strength value to calculate the distance:

$$D = 10^{\frac{C-RSSI}{10 \cdot n}} \quad (1)$$

where C is the reference transmit power at the source (e.g., the power as measured at distance of one meter from the device assuming an omnidirectional antenna, etc.), n is the propagation constant (e.g., 2 in free space, etc.), D is the distance and RSSI is the representative signal strength value. In other examples, the signal strength calculator 508 can estimate the distance associated with the transmitted advertising packets via any other suitable means. In some examples, the presence determiner 518 can make a presence determination based on the determined distance. In some examples, the presence determiner 518 can determine an identity associated with the captured advertising packets (e.g., using a user/device identifier, a BLE beacon ID, a MAC address, etc.).

The example presence report generator 520 transmits the presence determinations determined by the example presence detector 514, the example correlator 516, the example presence determiner 518 to the media monitor 112. For example, the presence report generator 520 can generate a report indicating when the user 104 was present in the media presentation area 102 to the media monitor 112. In some examples, the presence report generator 520 can also transmit a report indicating if any additional users were present in the media presentation area 102.

While an example manner of implementing the processing and communication module 308 of FIG. 3 is illustrated in FIG. 5, one or more of the elements, processes and/or devices illustrated in FIG. 4 may be combined, divided, re-arranged, omitted, eliminated and/or implemented in any other way. Further, the example receiver interface 502, the example signal strength value sorter 504, the example signal strength value selector 506, the example signal strength calculator 508, the example auxiliary device interface 510, the example radar interface 512, the example presence detector 514, the example correlator 516, the example presence determiner 518, the example presence reporter 520 and/or, more generally, the example processing and communication module 308 of FIG. 3 may be implemented by hardware, software, firmware and/or any combination of hardware, software and/or firmware. Thus, for example, any of the example receiver interface 502, the example signal strength value sorter 504, the example signal strength value selector 506, the example signal strength calculator 508, the example auxiliary device interface 510, the example radar interface 512, the example presence detector 514, the example correlator 516, the example presence determiner 518, the example presence reporter 520 and/or, more generally, the example processing and communication module 308 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver interface 502, the example signal strength value sorter 504, the example signal strength value selector 506, the example signal strength calculator 508, the example auxiliary device interface 510, the example radar interface 512, the example presence detector 514, the example correlator 516, the example presence determiner 518, the example presence reporter 520 is/are hereby expressly defined to include a non-transitory computer readable storage device or storage disk such as a memory, a digital versatile disk (DVD), a compact disk (CD), a Blu-ray disk, etc. including the software and/or firmware. Further still, the example processing and communication module 308 of FIGS. 1-3 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
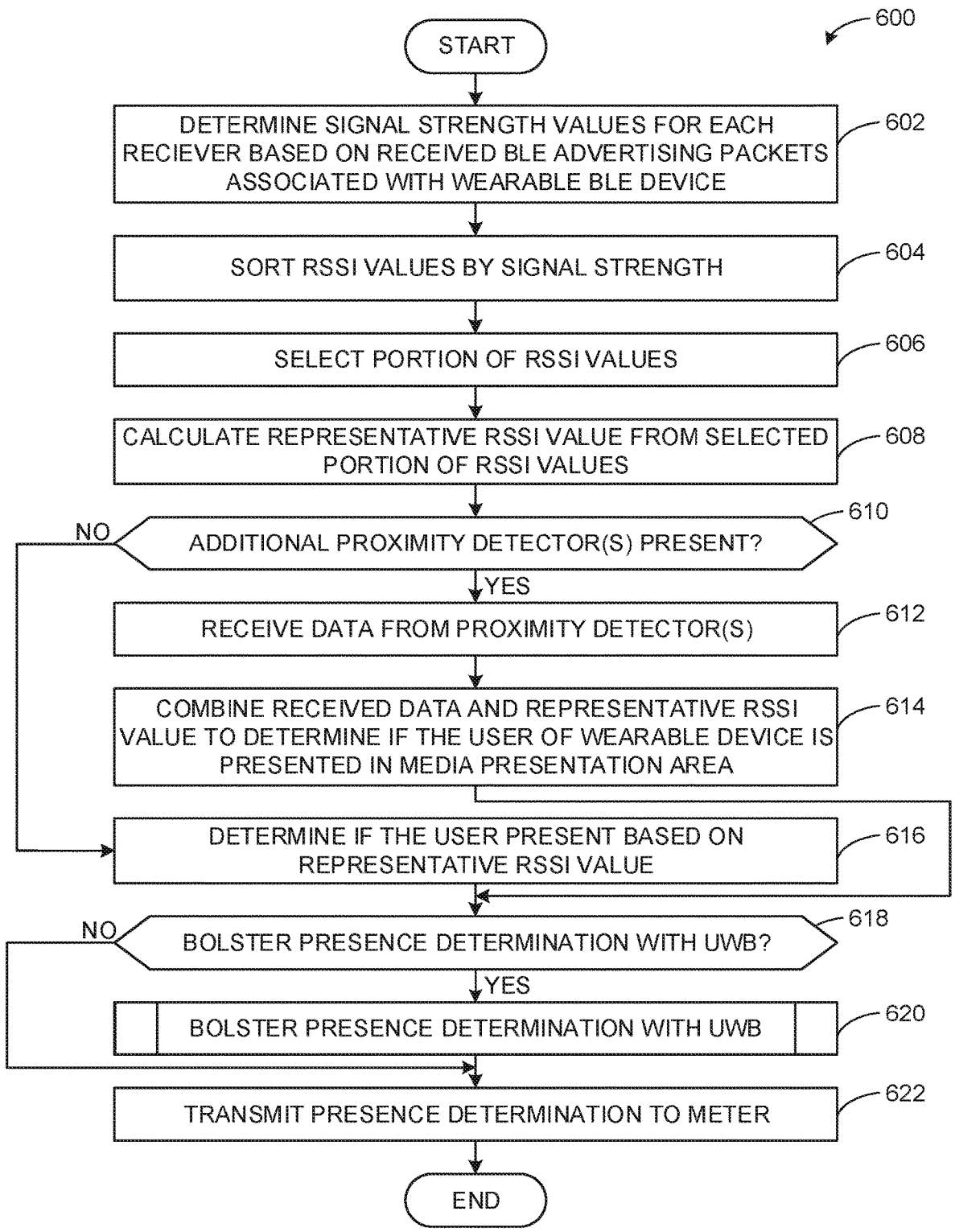
FIGS. 6-7 are flowcharts representative of machine readable instructions which may be executed to implement the proximity monitor of FIGS. 1-3.
Figure 7:
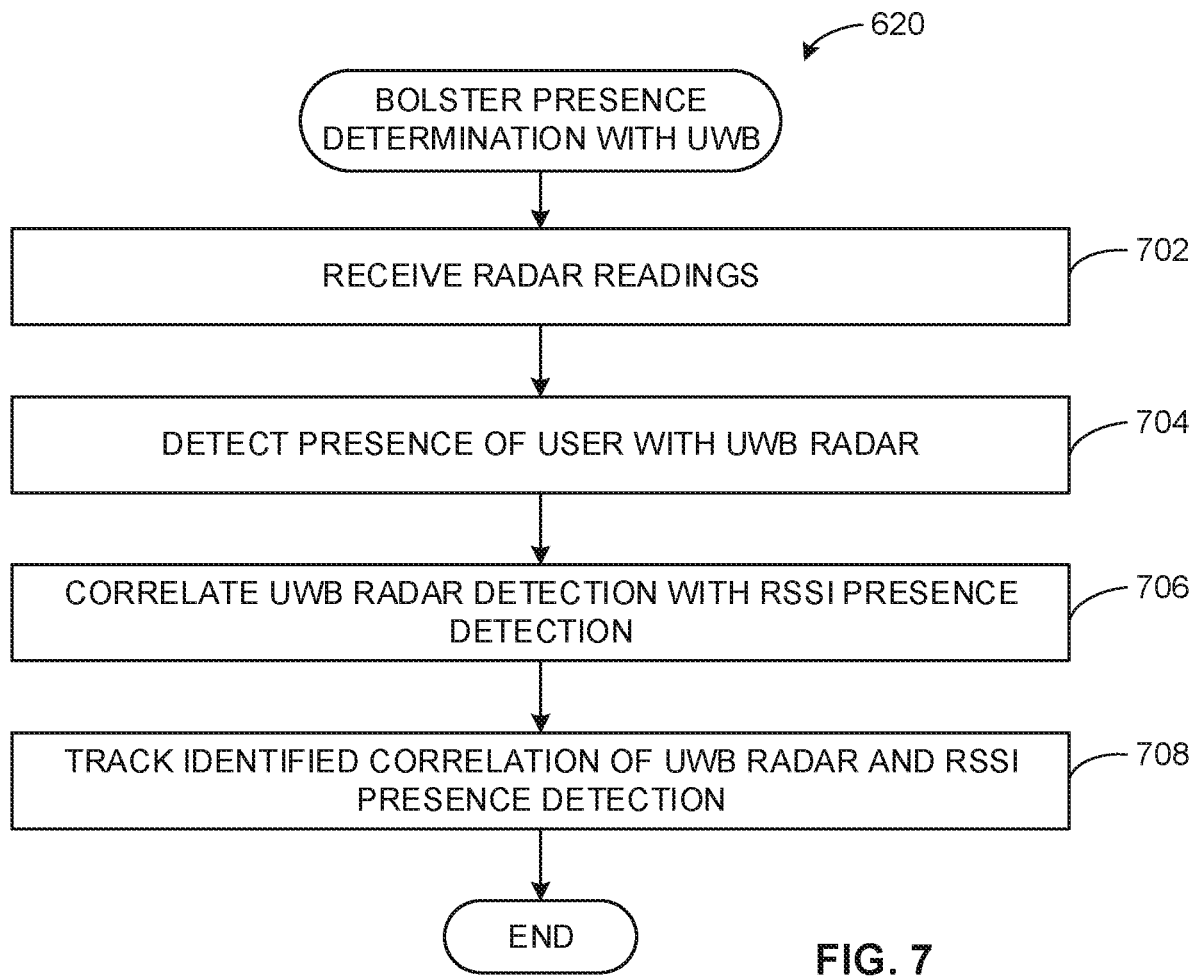

Flowcharts representative of example hardware logic, machine readable instructions, hardware implemented state machines, and/or any combination thereof for implementing the processing and communication module 308 of FIG. 1-3 are shown in FIGS. 6 and 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6-7, many other methods of implementing the example processing and communication module 308 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 includes an example process 600 to implement the example processing and communication module 308 of FIG. 5. The example process 600 begins at block 602. At block 602, the example receiver interface 502 determines RSSI values for each receiver based on the received BLE advertising packets associated with wearable BLE mobile device 106. For example, the receiver interface 502 can receive analog measurements of BLE advertising packets captured by the receivers 302, 304, 306. In some examples, the transmitted advertising packets allow the master proximity device to identify the user (e.g., the user 104) associated with the advertising packets. In some examples, the receiver interface 502 can determine the RSSI values associated with multiple polarities (e.g., associated with each axis of a multi-axis sensor) and along the three channels used by BLE devices are transmitted over. In some examples, the receiver interface 502 can receive RSSI values for multiple sensor arrays and/or proximity devices (e.g., the master proximity device 108 and/or auxiliary device, etc.).

At block 604, the example signal strength value sorter 504 sorts RSSI values by signal strength. For example, the signal strength value sorter 504 can sort the determined RSSI values based on their signal strength. In some examples, the example signal strength value sorter 504 can sort the received RSSI values (e.g., associated with a polarity and a channel, etc.) from highest RSSI value to lowest RSSI value, or vice versa.

At block 606, the signal strength value selector 506 selects a portion of RSSI values. For example, the signal strength value selector 506 can select a top half of the sorted RSSI values. In other examples, the signal strength value selector 506 can select any other portion of the sorted RSSI values (e.g., a middle portion, a lower portion, etc.). Additionally or alternatively, the signal strength value selector 506 can select the sorted RSSI based any other relevant properties of the sorted RSSI values (e.g., a channel, a polarity, comparing the RSSI values to a threshold, etc.).

At block 608, the example signal strength calculator 508 calculates representative RSSI value from the selected portion of RSSI values. For example, the signal strength calculator 508 can calculate a mean of the selected portion of the RSSI values. In other examples, the signal strength calculator 508 can calculate a representative RSSI value by any other suitable means (e.g., a geometric mean, a harmonic mean, a median, etc.). In some examples, the signal strength calculator 508 can be weighted or otherwise preference particular values of the sorted RSSI values (e.g., weighted by channel, weighted by polarity, weighted by originating device, etc.).

At block 610, the auxiliary device interface 510 determines if there are additional proximity detector(s) are present. For example, the auxiliary device interface 510 if the auxiliary proximity device 110 is present and/or power on. If the auxiliary device interface 510 determines that an additional proximity detector is present, the process 600 advances to block 612. If the auxiliary device interface 510 determines that an additional proximity detector is not present, the process 600 advances to block 616.

At block 612, the auxiliary device interface 510 receives data from the auxiliary proximity device(s) 110. For example, the auxiliary device interface 510 can receive a representative RSSI value from the auxiliary proximity device 110. In some examples, the auxiliary device interface 510 can receive other RSSI values from the auxiliary proximity device 110 (e.g., unsorted RSSI values, sorted RSSI values, etc.). In some examples, the auxiliary device interface 510 can receive any other suitable information from the auxiliary proximity device 110.

At block 614, the presence determiner 518 combines received data and representative RSSI (e.g., a first RSSI value, etc.) value to determine if the user 104 of the wearable mobile device 106 is present in media presentation area 102. For example, the presence determiner 518 can determine another representative RSSI value (e.g., a second RSSI value, etc.) based on the RSSI values determined by the receiver interface 502 and RSSI values received from the auxiliary proximity device 110. In such examples, the signal strength value 504 can sort the RSSI values received from the auxiliary proximate device 110 and the signal strength calculator 508 can calculate another representative RSSI value based on the combined sorted RSSI values. In some examples, the presence determiner 518 can receive a second representative RSSI value associated with the auxiliary device 110. In such examples, the presence determiner 518 can determine if a user is present based on the first representative RSSI and the second representative RSSI value.

At block 616, the presence determiner 518 determines if the user is present based on the representative RSSI value. For example, the presence determiner 518 can compare the representative RSSI value to a threshold value. In such examples, if the RSSI value satisfies (e.g., exceeds, etc.) the threshold, the presence determiner 518 can determine that a user was present in the media presentation area 102. In such examples, if the RSSI value does not satisfy (e.g., does not exceed, etc.) the threshold, the presence determiner 518 can determine that a user was not present in the media presentation area 102. In some examples, the threshold corresponds to a distance (e.g., a relationship defined via Equation 1, etc.). In some examples, the threshold can vary based on the mobile device 106 (e.g., vary based on the type of mobile device 106, vary based on a specific mobile device, etc.). In some examples, the threshold can be dynamic. For example, the threshold can change based on a configuration of the environment 100 (e.g., the position of obstructions, the presence of additional users, etc.). In such examples, sensor data from the UWB radar transceiver 120 can be used to actively calibrate the dynamic threshold. In other examples, the presence determiner 518 can use the combined data from the master proximity device 108 and one or more auxiliary proximity device(s) 110 to determine if a user was present in the media presentation area. For example, the presence determiner 518 can compare the combined representative RSSI value based on the combined sorted RSSI values to the threshold. In some examples, the presence determiner 518 can use a voting system to combine the received data and the representative RSSI value. For example, the presence determiner 518 can compare each representative RSSI value to a threshold (e.g., the same threshold, a different threshold corresponding to each proximity device, etc.). In such examples, if a sufficient quantity (e.g., a majority, etc.) satisfy the threshold(s), the presence determiner 518 determines a user is present. In other examples, the presence determiner 518 can use any other suitable method to determine if a user is present (e.g., trilateration, fingerprinting techniques, machine learning techniques, etc.).

At block 618, the presence determiner 518 determines if the presence determination is to be bolstered with UWB radar measurements. For example, the presence determiner 518 can determine if UWB radar measurements are available. In other examples, the presence determiner 518 can generate a confidence value of the presence determination (e.g., the amount the representative RSSI value exceeds the threshold, etc.). In such examples, if the confidence value is below a confidence threshold, the presence determiner can use the UWB radar measurements to bolster the presence determination. If the presence determiner 518 determines that the presence determination is to be bolstered with UWB radar measurements, the process 600 advances to block 620. If the presence determiner 518 determines that the presence determination is not to be bolstered with UWB radar measurements, the process 600 advances to block 622.

At block 620, the radar interface 512, the presence detector 514, the presence determiner 518 and the correlator 516 bolster the presence determination with ultra-wide band radar. An example execution of block 620 is described in greater detail below in conjunction with the process 700 of FIG. 7.

At block 622, presence report generator 520 transmits the presence determination to the media monitor 112. For example, the presence report generator 520 can transmit a record of what users where present in the media presentation area at a particular time to media monitor 112. In such examples, the presence report generator 520 can determine the identity of the present user(s) using the advertising packets associated with the RSSI values. In other examples, the presence report generator 520 can transmit any other suitable information of the media monitor 112.

FIG. 7 includes an example process 700 to implement block 620 of the example process 600. The example process begins at block 702. At block 702, the radar interface 512 can receive radar readings from the UWB radar transceiver 120. In some examples, the radar interface 512 can receive radar readings from any other suitable source.

At block 704, the presence detector 514 detects the presence of the user with the UWB radar transceiver 120. For example, the presence detector 514 can analyze the receive UWB radar readings to determine if a user is present in the media presentation area 102. For example, the presence detector 514 can analyze the returned pulses associated with the UWB radar transceiver 120 to determine if a user is present in the media presentation area 102, In some examples, the presence detector 514 can track an identified user using the radar readings.

At block 706, the correlator 516 correlates the UWB radar detection with the RSSI presence detection. For example, the correlator 516 can correlate a user detected via the presence detector 514 (e.g., via radar, etc.) and the presence determiner 518 (e.g., via BLE advertising packets, etc.) based a timing of when a user is detected. For example, if the presence detector 514 and the presence determiner 518 detect a user within a threshold time period of one another, the correlator 516 can determine that the presence detector 514 and the presence determiner 518 detected the same user (e.g., pair the readings from the presence detector 514 and the presence determiner 518, etc.). For example, the correlator 518 can pair readings from the UWB transceiver 120 indicating a user is approaching the master proximity device 108 with an increasing representative RSSI value determined by the signal strength calculator 508. For example, the correlator 518 can pair readings from the UWB transceiver 120 indicating a user is moving away from the master proximity device 108 with a decreasing representative RSSI value determined by the signal strength calculator 508. In some examples, the correlator 516 can assign a confidence value to an association between readings of the UWB radar transceiver 120 and the determination made by the presence detector 514. For example, if presence determiner 518 determines the user 104 is present in the presentation area 102 and the readings from the UWB radar transceiver 120 do indicate a user is present, the correlator 516 can assign a low confidence value to likelihood the user 104 is present in the media presentation area 102. In some examples, if the readings of the UWB radar transceiver 120 indicates a user is present in the media presentation area 102 and the presence detector 514 does not indicate the user 104 is present, the correlator 516 can determine that a user other than the user 104 is present the media presentation area 102. In some examples, the benefits of UWB detection (e.g., accuracy, etc.) can be combined with the benefits of advertising packets tracking (e.g., user identification, etc.). In such examples, the readings of the UWB radar transceiver 120 can be used to track (e.g., determine when the user 104 enters and leaves the media presentation area 102, etc.) after the readings of the UWB radar transceiver 120 have been paired (e.g., correlated, etc.) with the user 104 identified via the presence determiner 518. In some examples, after pairing readings, the broadcast interval of the advertising packets by the mobile device 106 can be increased to preserve battery life of the mobile device 106.

At block 708, the presence determiner 518 tracks the identified correlation of UWB radar and RSSI detection. For example, the presence determiner 518 can track the identified user 104 as the user 104 moves about the media presentation area 102. For example, the presence determiner 518 can identify when the user 104 enters and leaves the room based on the UWB radar readings. In such examples, the presence determiner 518 can determine when a user 104 leaves the media presentation area 102. The process 700 then returns to the example process 600.

Figure 8:
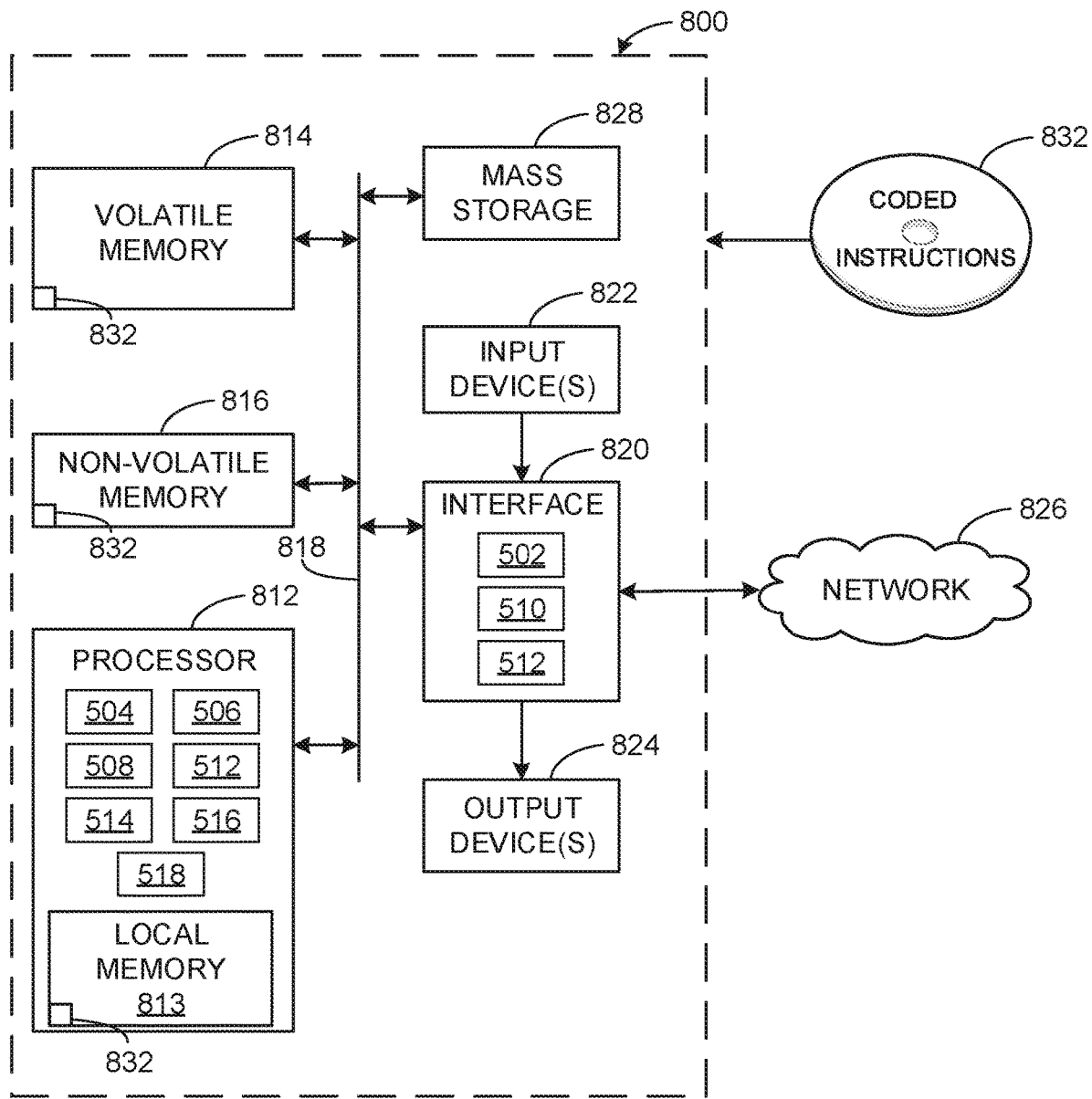
FIG. 8 is a block diagram of an example processing platform structured to execute the instructions of FIGS. 6 and/or 7 to implement the proximity monitor of FIGS. 1-3.

FIG. 8 is a block diagram of an example processor platform 800 structured to execute the instructions of FIGS. 6-7 to implement the processing and communication module 308 of FIGS. 3 and 5. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example signal strength value sorter 504, the example signal strength value selector 506, the example signal strength calculator 508, the example presence detector 514, the example correlator 516, the example presence determiner 518, and the example presence report generator 520.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 820 implements the example receiver interface 502, the example auxiliary device interface 510, and the example radar interface 512.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and 7 may be stored in the mass storage device 828, in the volatile memory 814, in the non-volatile memory 816, and/or on a removable non-transitory computer readable storage medium such as a CD or DVD.

Example methods, apparatus, systems, and articles of manufacture for multimodal audience detection and identification are disclosed herein. Further examples and combinations thereof include the following:

Example 1 includes a proximity detection apparatus, the apparatus comprising a signal strength value selector to select a portion of a set of signal strength values associated with advertising packets from a device associated with a user, the advertising packets captured by a multi-axis receiver on a plurality of different signal polarizations, a signal strength calculator to calculate a first representative signal strength value based on the selected portion of signal strength values, and a presence determiner to determine a presence of the user based on whether the first representative signal strength value satisfies a threshold.

Example 2 includes the apparatus of example 1, wherein the set of signal strength values includes signal strength values from one or more advertising channels and the plurality of different signal polarizations.

Example 3 includes the apparatus of example 1, wherein the presence determiner is further to determine demographics associated with the user based on the advertising packets, and further including a presence report generator to generate a report to indicate whether the presence of the user was detected.

Example 4 includes the apparatus of example 3, wherein the presence is a first presence, and further including a presence detector to detect a second presence of the user based on a radar reading, and a correlator to correlate the first presence and the second presence, the correlation associating the demographics of the user with the second presence, and track the user via the second presence.

Example 5 includes the apparatus of example 3, wherein the presence report generator is to transmit the report to a media meter, the media meter to conduct media monitoring based on the report.

Example 6 includes the apparatus of example 1, further including an auxiliary device interface to receive a second representative signal strength value from an auxiliary device, and the presence determiner to determine the presence based on the second representative signal strength value.

Example 7 includes the apparatus of example 1, wherein the advertising packets are Bluetooth advertising packets and the signal strength values are received signal strength indicator (RSSI) values.

Example 8 includes a method comprising selecting a portion of a set of signal strength values associated with advertising packets from a device associated with a user, the advertising packets captured by a multi-axis receiver on a plurality of different signal polarizations, calculating a first representative signal strength value based on the selected portion of signal strength values, and determining a presence of the user based on whether the first representative signal strength value satisfies a threshold.

Example 9 includes the method of example 8, wherein the set of signal strength values includes signal strength values from one or more advertising channels and the plurality of different signal polarizations.

Example 10 includes the method of example 8, further including determining demographics associated with the user based on the advertising packets, and further including a presence report generator to generate a report to indicate whether the presence of the user was detected.

Example 11 includes the method of example 10, wherein the presence is a first presence, and further including detecting a second presence of the user based on a radar reading, and correlating the first presence and the second presence, the correlation associating the demographics of the user with the second presence, and tracking the user via the second presence.

Example 12 includes the method of example 10, further including transmitting the report to a media meter, the media meter to conduct media monitoring based on the report.

Example 13 includes the method of example 8, further including receiving a second representative signal strength value from an auxiliary device, and determining the presence based on the second representative signal strength value.

Example 14 includes the method of example 8, wherein the advertising packets are Bluetooth advertising packets and the signal strength values are received signal strength indicator (RSSI) values.

Example 15 includes a non-transitory computer readable medium including instructions which, when executed, cause a processor to at least select a portion of a set of signal strength values associated with advertising packets from a device associated with a user, the advertising packets captured by a multi-axis receiver on a plurality of different signal polarizations, calculate a first representative signal strength value based on the selected portion of signal strength values, and determine a presence of the user based on whether the first representative signal strength value satisfies a threshold.

Example 16 includes the non-transitory computer readable medium of example 15, wherein the set of signal strength values includes signal strength values from one or more advertising channels and the plurality of different signal polarizations.

Example 17 includes the non-transitory computer readable medium of example 15, wherein the instructions further cause the processor to determine demographics associated with the user based on the advertising packets, and further including a presence report generator to generate a report to indicate whether the presence of the user was detected.

Example 18 includes the non-transitory computer readable medium of example 17, wherein the presence is a first presence, and the instructions further cause the processor to detect a second presence of the user based on a radar reading, and correlate the first presence and the second presence, the correlation associating the demographics of the user with the second presence, and track the user via the second presence.

Example 19 includes the non-transitory computer readable medium of example 17, wherein the instructions further cause the processor to transmit the report to a media meter, the media meter to conduct media monitoring based on the report.

Example 20 includes the non-transitory computer readable medium of example 15, wherein the instructions further cause the processor to receive a second representative signal strength value from an auxiliary device, and determine the presence based on the second representative signal strength value.

From the foregoing, it will be appreciated that example methods, apparatus and articles of manufacture have been disclosed for multimodal audience detection and identification. Example methods, apparatus and articles of manufacture disclosed herein improve the efficiency of using a computing device by enabling the tracking of panelists using advertising packets from mobile/wearable BLE devices and/or UWB radar. Examples disclosed herein improve the accuracy of distance determination based on advertising packet by calculating a representative signal strength value based on combining signal strengths captured on multiple polarities, channels and/or devices (e.g., locations, etc.). The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A proximity detection apparatus, the apparatus comprising:
   a signal strength value selector to select a portion of a set of signal strength values associated with advertising packets from a device associated with a user, the advertising packets captured by a multi-axis receiver on a plurality of different signal polarizations, the multi-axis receiver to capture first ones of the advertising packets along a first axis polarity, second ones of the advertising packets along a second axis polarity transverse relative to the first axis polarity, and third ones of the advertising packets along a third axis polarity, the third axis polarity is transverse relative to the first axis polarity and the second axis polarity;
   a signal strength calculator to calculate a first representative signal strength value based on the selected portion of signal strength values; and
   a presence determiner to determine a presence of the user based on whether the first representative signal strength value satisfies a threshold.

2. The apparatus of claim 1, wherein the set of signal strength values includes signal strength values from one or more advertising channels and the plurality of different signal polarizations.

3. The apparatus of claim 1, wherein the presence determiner is further to determine demographics associated with the user based on the advertising packets, and further including a presence report generator to generate a report to indicate whether the presence of the user was detected.

4. The apparatus of claim 3, wherein the presence is a first presence, and further including:
   a presence detector to detect a second presence of the user based on a radar reading; and
   a correlator to:
      correlate the first presence and the second presence, the correlation associating the demographics of the user with the second presence; and
      track the user via the second presence.

5. The apparatus of claim 3, wherein the presence report generator is to transmit the report to a media meter, the media meter to conduct media monitoring based on the report.

6. The apparatus of claim 1, further including:
   an auxiliary device interface to receive a second representative signal strength value from an auxiliary device; and
   the presence determiner to determine the presence based on the second representative signal strength value.

7. The apparatus of claim 1, wherein the advertising packets are Bluetooth advertising packets and the signal strength values are received signal strength indicator (RSSI) values.

8. The apparatus of claim 1, wherein the multi-axis receiver includes a first receiver configured to capture the first ones of the advertising packets along the first axis polarity, a second receiver configured to capture the second ones of the advertising packets along the second axis polarity, and a third receiver configured to capture the third ones of the advertising packets along a third axis polarity.

9. A method comprising:
   selecting, via at least one processor, a portion of a set of signal strength values associated with advertising packets from a device associated with a user, the advertising packets captured by a multi-axis receiver on a plurality of different signal polarizations, the multi-axis receiver to capture first ones of the advertising packets along a first axis polarity, second ones of the advertising packets along a second axis polarity transverse relative to the first axis polarity, and third ones of the advertising packets along a third axis polarity, the third axis polarity is transverse relative to the first axis polarity and the second axis polarity;

calculating, via at least one processor, a first representative signal strength value based on the selected portion of signal strength values; and determining, via at least one processor, a presence of the user based on whether the first representative signal strength value satisfies a threshold.

10. The method of claim 9, wherein the set of signal strength values includes signal strength values from one or more advertising channels and the plurality of different signal polarizations.

11. The method of claim 9, further including determining demographics associated with the user based on the advertising packets, and further including a presence report generator to generate a report to indicate whether the presence of the user was detected.

12. The method of claim 11, wherein the presence is a first presence, and further including:

detecting a second presence of the user based on a radar reading; and correlating the first presence and the second presence, the correlation associating the demographics of the user with the second presence; and tracking the user via the second presence.

13. The method of claim 11, further including transmitting the report to a media meter, the media meter to conduct media monitoring based on the report.

14. The method of claim 9, further including:

receiving a second representative signal strength value from an auxiliary device; and determining the presence based on the second representative signal strength value.

15. The method of claim 9, wherein the advertising packets are Bluetooth advertising packets and the signal strength values are received signal strength indicator (RSSI) values.

16. A non-transitory computer readable medium including instructions which, when executed, cause a processor to at least:

select a portion of a set of signal strength values associated with advertising packets from a device associated with a user, the advertising packets captured by a multi-axis receiver on a plurality of different signal polarizations, the multi-axis receiver to capture first ones of the advertising packets along a first axis polarity, second ones of the advertising packets along a second axis polarity transverse relative to the first axis polarity, and third ones of the advertising packets along a third axis polarity, the third axis polarity is transverse relative to the first axis polarity and the second axis polarity;

calculate a first representative signal strength value based on the selected portion of signal strength values; and determine a presence of the user based on whether the first representative signal strength value satisfies a threshold.

17. The non-transitory computer readable medium of claim 16, wherein the set of signal strength values includes signal strength values from one or more advertising channels and the plurality of different signal polarizations.

18. The non-transitory computer readable medium of claim 16, wherein the instructions further cause the processor to determine demographics associated with the user based on the advertising packets, and further including a presence report generator to generate a report to indicate whether the presence of the user was detected.

19. The non-transitory computer readable medium of claim 18, wherein the presence is a first presence, and the instructions further cause the processor to:

detect a second presence of the user based on a radar reading; and correlate the first presence and the second presence, the correlation associating the demographics of the user with the second presence; and track the user via the second presence.

20. The non-transitory computer readable medium of claim 18, wherein the instructions further cause the processor to transmit the report to a media meter, the media meter to conduct media monitoring based on the report.

21. The non-transitory computer readable medium of claim 16, wherein the instructions further cause the processor to:

receive a second representative signal strength value from an auxiliary device; and determine the presence based on the second representative signal strength value.

\* \* \* \* \*